US009853554B2

(12) United States Patent
Chang

(10) Patent No.: US 9,853,554 B2
(45) Date of Patent: Dec. 26, 2017

(54) FLYBACK CONVERTER AND CONTROL CIRCUIT WITH STANDBY MODE

(71) Applicant: RICHTEK TECHNOLOGY CORPORATION, Chupei, HsinChu (TW)

(72) Inventor: Kuang-Fu Chang, Kaohsiung (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 0 days.

(21) Appl. No.: 15/153,436

(22) Filed: May 12, 2016

(65) Prior Publication Data

US 2016/0352232 A1 Dec. 1, 2016

Related U.S. Application Data

(60) Provisional application No. 62/166,066, filed on May 25, 2015.

(51) Int. Cl.
*H02M 3/335* (2006.01)
*G06F 1/26* (2006.01)
*H02M 1/00* (2006.01)

(52) U.S. Cl.
CPC ........ *H02M 3/33523* (2013.01); *G06F 1/266* (2013.01); *H02M 2001/0025* (2013.01); *H02M 2001/0032* (2013.01); *Y02B 70/16* (2013.01)

(58) Field of Classification Search
CPC .............................. H02M 2001/0032
See application file for complete search history.

(56) References Cited

U.S. PATENT DOCUMENTS

| | | | |
|---|---|---|---|
| 4,326,244 A * | 4/1982 | Josephson | H02M 3/335 363/21.12 |
| 8,533,508 B2 | 9/2013 | Chang et al. | |
| 2012/0250366 A1* | 10/2012 | Wang | H02M 3/33523 363/21.15 |
| 2016/0308452 A1* | 10/2016 | Motoki | H02M 3/33523 |
| 2016/0329816 A1* | 11/2016 | Zhang | H02M 3/33507 |

* cited by examiner

*Primary Examiner* — Harry Behm
*Assistant Examiner* — Peter Novak
(74) *Attorney, Agent, or Firm* — Tung & Associates

(57) ABSTRACT

The present invention provides a power converter, and a control circuit and a standby power saving method thereof. The power converter provides an output voltage from an output terminal through an enable switch circuit to a power receiver. A detection signal shows whether a voltage at a signal transmission pin of the power converter is in a predetermined range, if not, the enable switch circuit is turned OFF. The power converter adjusts a feedback signal according to the detection signal or according to the detection signal and the output voltage, so as to adjust the output voltage to be lower than a normal operation level in a normal operation mode, to save power in a standby mode.

15 Claims, 7 Drawing Sheets

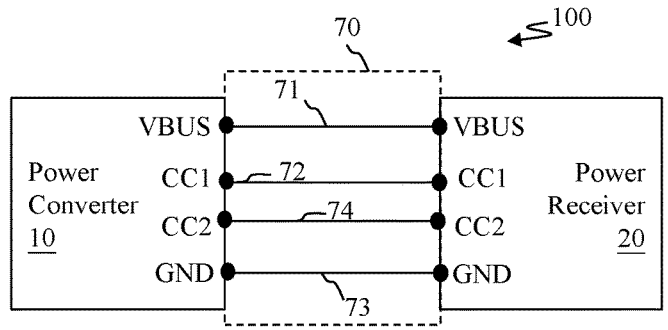
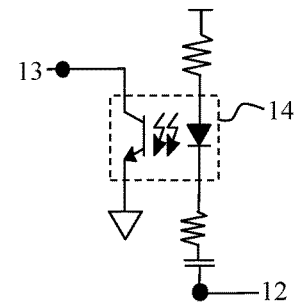
Fig. 1A
Fig. 2
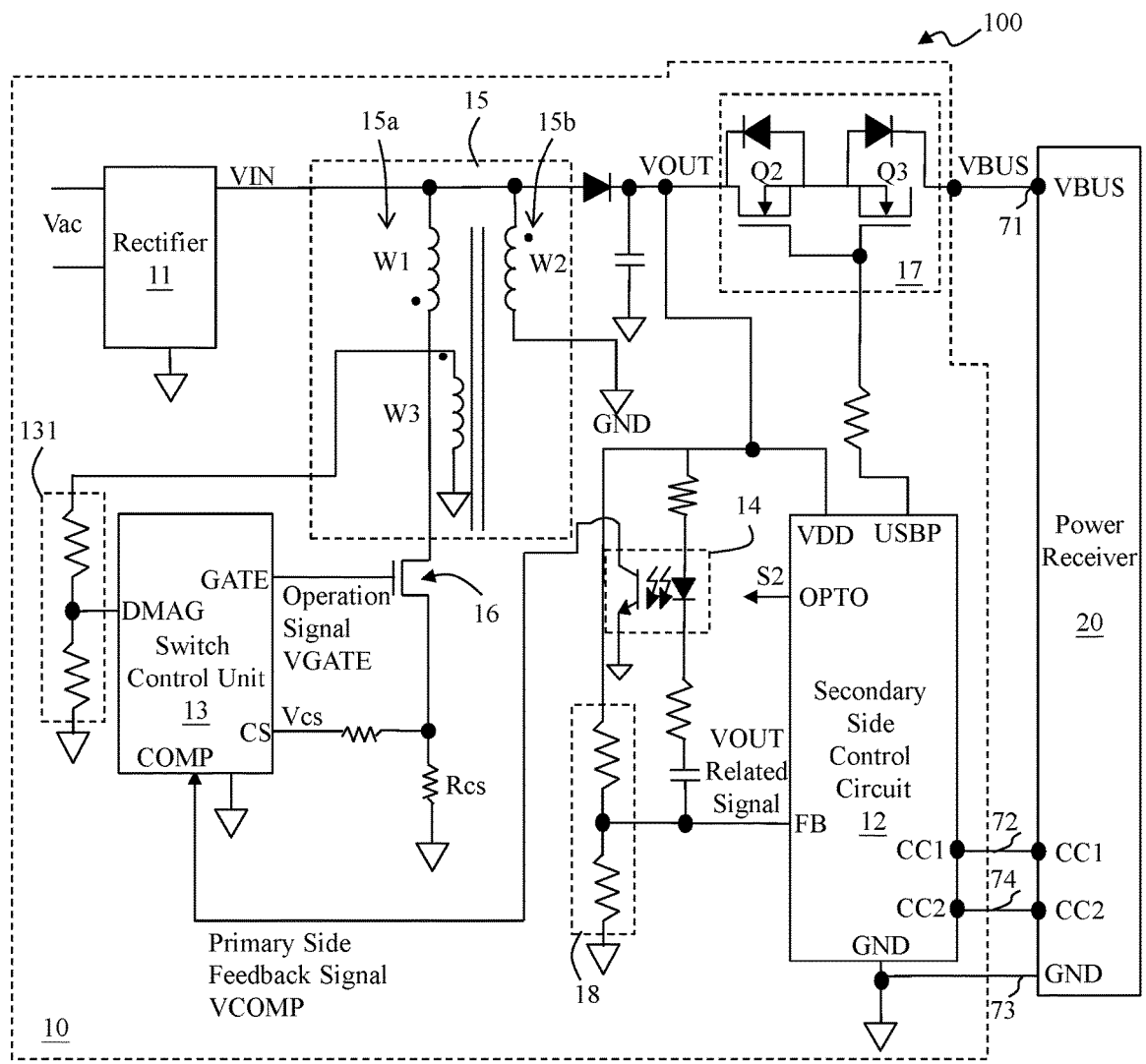
Fig. 1B

FLYBACK CONVERTER AND CONTROL CIRCUIT WITH STANDBY MODE

CROSS REFERENCE

The present invention claims priority to U.S. 62/166,066, filed on May 25, 2015.

BACKGROUND OF THE INVENTION

Field of Invention

The present invention relates to a power converter and a control circuit and a standby power saving method thereof; particularly, it relates to such a power converter which can save power when the power converter is under a standby mode by adjusting the output voltage, and a control circuit and a standby power saving method of the power converter.

Description of Related Art

Power saving has become an important issue for a power converter, and it is becoming more and more important for a power converter to reduce its power consumption in a standby mode. USB Type-C connector is a new standard, and it is important for a power converter for use in cooperation with a USB Type-C connector to reduce its power consumption, in particular in a standby mode.

For relevant details of the prior art, one can refer to U.S. Pat. No. 8,533,508 B2.

In view of the above, the present invention proposes a power converter and a control circuit and a standby power saving method thereof, which can save power in a standby mode of the power converter.

SUMMARY OF THE INVENTION

From one perspective, the present invention provides a power converter, configured to operably convert an input voltage to an output voltage at an output terminal of the power converter and supply power to a power receiver connected to the output terminal, the power converter comprising: a transformer; a power switch which is coupled to a primary winding of the transformer and which is configured to be operably turned ON or turned OFF according to an operation signal, to control the transformer so that the input voltage is converted to the output voltage; a switch control unit which is coupled to the power switch and which is configured to operably generate the operation signal according to a primary side feedback signal; an enable switch circuit which is coupled between the output terminal and the power receiver, to control power transmission from the output terminal to the power receiver; a secondary side control circuit which is coupled to the secondary winding of the transformer, the secondary side control circuit having at least one signal transmission pin for communicating with the power receiver, wherein the secondary side control circuit controls the enable switch circuit according to a voltage at the at least one signal transmission pin and the secondary side control circuit generates a secondary side feedback signal according to the output voltage; and a feedback circuit having one end coupled to the switch control unit and another end coupled to the secondary side control circuit, wherein the feedback circuit is configured to operably generate the primary side feedback signal according to the secondary side feedback signal; wherein the secondary side control circuit adjusts the secondary side feedback signal (1) according to the voltage at the at least one signal transmission pin, or (2) according to the voltage at the at least one signal transmission pin and the output voltage, so as to adjust the output voltage; thereby, when the power converter is in a standby mode, the output voltage is lower than a normal operation level in a normal operation mode, to save power in the standby mode.

In one embodiment, when the power converter is in the standby mode, the output voltage is regulated at a standby power saving level which is lower than the normal operation level, or the output voltage hiccups within a range which is lower than the normal operation level.

In one embodiment, the secondary side control circuit includes: a signal transmission pin voltage detection circuit which is coupled to the at least one signal transmission pin and which is configured to operably generate a detection signal according to the voltage at the at least one signal transmission pin; a shunt regulator which is configured to operably generate the secondary side feedback signal according to a signal related to the output voltage (output voltage related signal); a standby adjustment circuit which is coupled to the signal transmission pin voltage detection circuit and the shunt regulator and which is configured to operably adjust the secondary side feedback signal at least according to the detection signal.

In one embodiment, the standby adjustment circuit adjusts the secondary side feedback signal according to the detection signal and the output voltage.

In one embodiment, when the power converter is in the standby mode, the standby adjustment circuit causes the shunt regulator to select a low level reference voltage, to adjust the secondary side feedback signal, whereby the output voltage is regulated at a standby power saving level which is lower than the normal operation level; and when the power converter is in the normal operation mode, the standby adjustment circuit causes the shunt regulator to select a high level reference voltage, to adjust the secondary side feedback signal, whereby the output voltage is regulated at the normal operation level.

In one embodiment, when the power converter is in the standby mode and when the output voltage is higher than a lower limit of the range, the standby adjustment circuit causes the shunt regulator to select a low level reference voltage, thereby causing the output voltage to lower down; and when the power converter is in the standby mode and when the output voltage is decreased to the lower limit of the range, the standby adjustment circuit causes the shunt regulator to select a high level reference voltage, thereby causing the output voltage to rise up.

In one embodiment, the standby adjustment circuit includes at least an adjustment switch, which is configured to operably adjust the secondary side feedback signal, wherein the standby adjustment circuit controls the adjustment switch according to the detection signal, to adjust the secondary side feedback signal, so that the output voltage is regulated at the standby power saving level in the standby mode.

In one embodiment, the standby adjustment circuit includes at least an adjustment switch, which is configured to operably adjust the secondary side feedback signal, wherein the standby adjustment circuit controls the adjustment switch according to the detection signal and the output voltage, to adjust the secondary side feedback signal, so that the output voltage hiccups within a range which is lower than the normal operation level.

In one embodiment, when the power converter is in the standby mode and when the output voltage is higher than a lower limit of the range, the standby adjustment circuit controls the adjustment switch to adjust the secondary side feedback signal, thereby causing the output voltage to lower down; and when the power converter is in the standby mode and when the output voltage is decreased to the lower limit of the range, the standby adjustment circuit controls the adjustment switch to adjust the secondary side feedback signal, thereby causing the output voltage to rise up.

From another perspective, the present invention provides a standby power saving method of a power converter, wherein the power converter is configured to convert an input voltage to an output voltage at an output terminal of the power converter, for supplying power to a power receiver connected to the output terminal, the power converter having at least one signal transmission pin for communicating with the power receiver; the standby power saving method comprising: providing an enable switch circuit, which is configured to be coupled between the output terminal and the power receiver to control power transmission from the output terminal to the power receiver; controlling the enable switch circuit according to a voltage at the at least one signal transmission pin; generating a secondary side feedback signal according to the output voltage; generating a primary side feedback signal according to the secondary side feedback signal; adjusting the secondary side feedback signal (1) according to the voltage at the at least one signal transmission pin or (2) according to the voltage at the at least one signal transmission pin and the output voltage, so as to adjust the output voltage; thereby, when the power converter is in a standby mode, the output voltage is lower than a normal operation level in a normal operation mode, to save power in the standby mode.

From still another perspective, the present invention provides a control circuit of a power converter having a transformer, the control circuit being configured to operably control a secondary side of the transformer, the power converter being configured to operably convert an input voltage to an output voltage at an output terminal of the power converter and supply power to a power receiver connected to the output terminal, the power converter comprising: a primary side circuit which is configured to operably control the transformer according to a primary side feedback signal, to convert the input voltage to the output voltage; a feedback circuit having one end coupled to the primary side circuit and another end coupled to the control circuit, wherein the feedback circuit is configured to operably generate the primary side feedback signal according to a secondary side feedback signal generated by the control circuit; and an enable switch circuit which is coupled between the output terminal and the power receiver to control power transmission from the output terminal to the power receiver; the control circuit comprising: at least one signal transmission pin which is configured to operably communicate with the power receiver; a signal transmission pin voltage detection circuit which is coupled to the at least one signal transmission pin and which is configured to operably generate a detection signal according to the voltage at the at least one signal transmission pin; a shunt regulator which is configured to operably generate the secondary side feedback signal according to an output voltage related signal; a standby adjustment circuit which is coupled to the signal transmission pin voltage detection circuit and the shunt regulator and which is configured to operably adjust the secondary side feedback signal at least according to the detection signal; thereby, when the power converter is in a standby mode, by adjusting the secondary side feedback signal, the output voltage is regulated to be lower than a normal operation level in a normal operation mode, to save power in the standby mode.

The objectives, technical details, features, and effects of the present invention will be better understood with regard to the detailed description of the embodiments below, with reference to the attached drawings.

BRIEF DESCRIPTION OF THE DRAWINGS

FIG. 1A shows a block diagram of a power converter 10 which is connected to a power receiver 20 according to an embodiment of the present invention.

FIG. 1B shows an embodiment of a power converter according to the present invention.

FIG. 2 shows an embodiment of a feedback circuit 14 according to the present invention.

DESCRIPTION OF THE PREFERRED EMBODIMENTS

Figure 3:
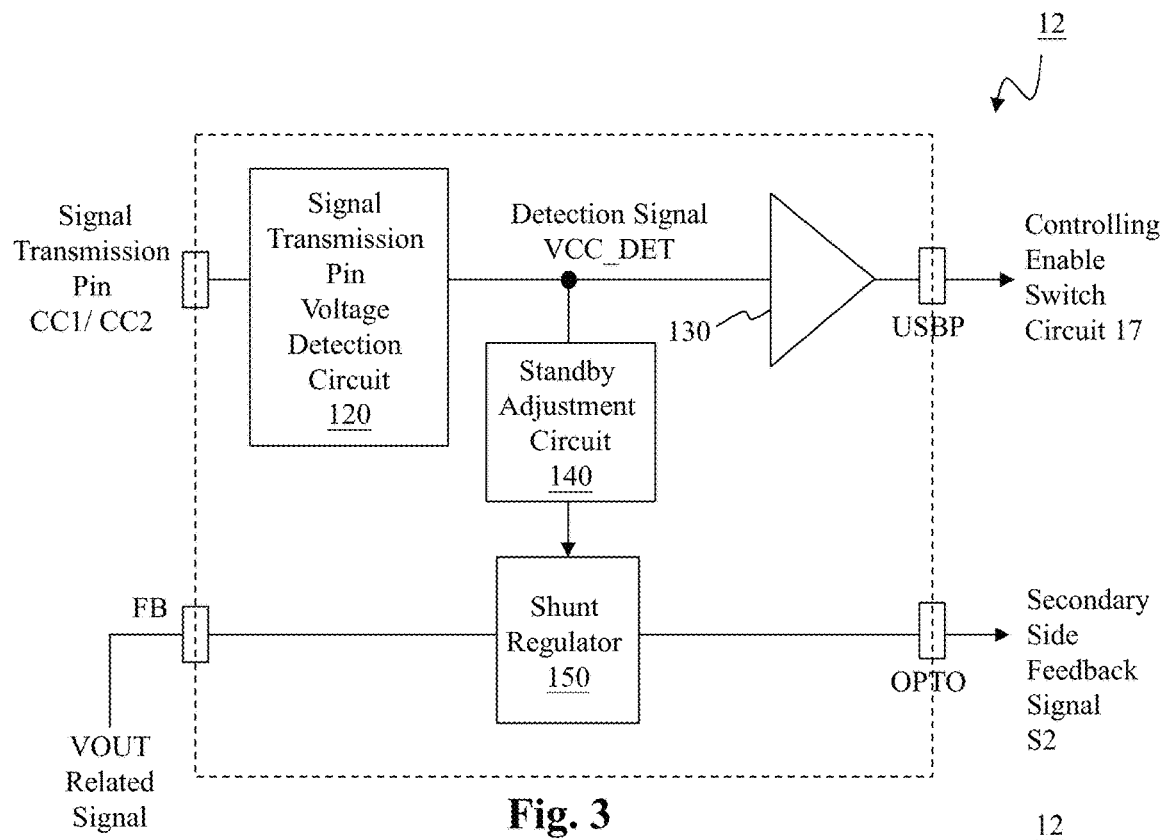
FIG. 3 shows a block diagram of a secondary side control circuit 12 according to an embodiment of the present invention.

The above and other technical details, features and effects of the present invention will be will be better understood with regard to the detailed description of the embodiments below, with reference to the drawings. The drawings as referred to throughout the description of the present invention are for illustration only, to show the interrelations between the apparatus and devices, but not drawn according to actual scale.

Please refer to FIG. 1A, FIG. 1B and FIG. 2. FIG. 1A shows a block diagram of a power converter 10 which is connected to a power receiver 20 according to an embodiment of the present invention. FIG. 1B shows an embodiment of the power converter 10. FIG. 2 shows an embodiment of a feedback circuit 14. As shown in FIG. 1A, a power supply system 100 comprises a power converter 10, a cable 70 and a power receiver 20. The power converter 10 functions as a power supplier. The power receiver 20 can be for example but not limited to a portable electronic device such as a mobile phone, a tablet computer or a notebook computer. The power converter 10 and the power receiver 20 are coupled to each other through the cable 70, so that power is transmitted from the power converter 10 to the power receiver 20. The cable 70 includes a positive power transmission line 71, a negative power transmission line 73, a signal transmission line 72 and a signal transmission line 74. When the power converter 10 and the power receiver 20 are coupled to each other through the cable 70, the positive power transmission line 71 and the negative power transmission line 73 form a loop to transmit power. The signal transmission line 72 is connected between a signal transmission pin CC1 of the power converter 10 and a corresponding signal transmission pin CC1 of the power receiver 20, for bi-directionally transmitting signals between the power converter 10 and the power receiver 20. The signal transmission line 74 is connected between a signal transmission pin CC2 of the power converter 10 and a corresponding signal transmission pin CC2 of the power receiver 20, for bi-directionally transmitting signals between the power converter 10 and the power receiver 20. The above-described configuration is a power supply system following the standard of a USB Type-C connector; however, the present invention is not limited to this configuration. For example, the present invention is still applicable if the cable 70 includes only one single signal transmission line (72 or 74).

In this embodiment, the power converter 10 is for example but not limited to an isolated type AC-DC converter the power converter 10 can convert an input voltage VIN to an output voltage VOUT at an output terminal VOUT of the power converter 10, so as to supply power to the power receiver 20 connected to the output terminal VOUT. In the embodiment of an isolated type AC-DC converter, the power converter 10 comprises: a transformer 15, a power switch 16, a switch control unit 13, a signal coupling circuit 16, an enable switch circuit 17, a secondary side control circuit 12, a feedback circuit 14 and a current sensing resistor Rcs. The secondary side control circuit 12 for example can be an integrated circuit. Because an isolated type AC-DC converter is well known to those skilled in the art, for the sake of simplicity in figures, only circuit details relevant to the present invention are illustrated, while the other circuit details irrelevant to the present invention are omitted.

The transformer 15 includes a primary winding W1, a secondary winding W2 and a tertiary winding W3. The primary winding W1 is at a primary side 15a of the transformer 15, for receiving the input voltage VIN. The secondary winding W2 is at a secondary side 15b of the transformer 15, for generating the output voltage VOUT at the output terminal VOUT. The tertiary winding W3 is at a primary side 15a of the transformer 15, for generating information related to the input voltage VIN, and/or for supplying power required by the switch control unit 13 according to the input voltage VIN. If the switch control unit 13 can retrieve power via other approaches and does not need to retrieve information related to the input voltage VIN, the tertiary winding W3 can be omitted. In one embodiment, the input voltage VIN can be generated by an alternating power supply Vac through a rectifier 11.

The power switch 16 is coupled to the primary winding W1 of the transformer 15 and switches ON or OFF according to an operation signal VGATE, to control a current flowing through the primary winding W1, so that the input voltage VIN is converted to the output voltage VOUT through inductive coupling between the primary winding W1 and the secondary winding W2.

The switch control unit 13 is configured to operably generate the operation signal VGATE (which is outputted from an operation signal terminal GATE of the switch control unit 13), to control the power switch 16. In this embodiment, the switch control unit 13 generates the operation signal VGATE according to a current sensing signal Vcs received from a current sensing terminal CS of the switch control unit 13 and a primary side feedback signal COMP received from a primary side feedback signal terminal COMP of the switch control unit 13. In addition, the switch control unit 13 receives information related to the input voltage VIN from an input voltage terminal DMAG of the switch control unit 13. Such information related to the input voltage VIN can be retrieved via, for example but not limited to, an input voltage detection circuit 131 (one embodiment of the input voltage detection circuit 131 is shown in FIG. 1B).

The enable switch circuit 17 is coupled between the output terminal VOUT and the power receiver 20 and is configured to operably control power transmission from the output terminal VOUT to the power receiver 20. In one embodiment, the enable switch circuit 17 can include, for example but not limited to, a transistor switch Q2 and a transistor switch Q3. In this embodiment, each of the transistor switch Q2 and the transistor switch Q3 can be for example but not limited to an NMOS transistor switch. In another embodiment, each of the transistor switch Q2 and the transistor switch Q3 can be for example but not limited to a PMOS transistor switch. The enable switch circuit 17 does not necessarily need to include two transistor switches. In other embodiment, the enable switch circuit 17 can include only one transistor switch.

The secondary side control circuit 12 is coupled to the feedback circuit 14, the enable switch circuit 17 and the secondary winding W2 of the transformer 15. As shown in FIG. 1B, the secondary side control circuit 12 has two signal transmission pins CC1 and CC2 for communicating with the power receiver 20. The signal transmission line 72 is capable of providing bi-directional communication between the signal transmission pin CC1 of the secondary side control circuit 12 and the signal transmission pin CC1 of the power receiver 20. The signal transmission line 74 is capable of providing bi-directional communication between the signal transmission pin CC2 of the secondary side control circuit 12 and the signal transmission pin CC2 of the power receiver 20.

In this embodiment, the secondary side control circuit generates a secondary side feedback signal S2. The secondary side control circuit 12 receives a signal related to the output voltage VOUT (Vout related signal) from a pin FB of the secondary side control circuit 12. This VOUT related signal can be retrieved via, for example but not limited to, an output voltage detection circuit 18 (one embodiment of the output voltage detection circuit 18, which is for example but not limited to a voltage divider circuit, is shown in FIG. 1B). Besides, the secondary side control circuit 12 controls the enable switch circuit 17 according to a voltage at at least one of the signal transmission pins (CC1 or CC2). The details as to how the secondary side control circuit 12 controls the enable switch circuit 17 will be described later.

The feedback circuit 14 has one end coupled to the switch control unit 13 and another end coupled to the secondary side control circuit 12. The feedback circuit 14 generates the primary side feedback signal VCOMP according to the secondary side feedback signal S2. Because the power converter 10 of this embodiment is an isolated type AC-DC converter, in one embodiment, the feedback circuit 14 can correspondingly be an isolated type feedback circuit which is for example but not limited to an opto-coupler circuit, as shown in FIG. 2.

The present invention is different from the prior art in that: in the prior art, regardless of the connection between the output terminal VOUT and the power receiver 20, as long as the power converter 10 is under operation, the power converter 10 will regulate the output voltage VOUT to a predetermined target level (i.e., the above-mentioned normal operation level, such as 5V). The present invention, however, will set the power converter 10 in a standby mode when the output terminal VOUT is not connected to the power receiver 20 or when the output terminal VOUT does not need to supply power to the power receiver 20, to save power. When the power converter 10 is in the standby mode, the present invention reduces the output voltage VOUT by adjusting the secondary side feedback signal S2.

Please refer to FIG. 3, which shows a block diagram of a secondary side control circuit 12 according to an embodiment of the present invention.

As shown in FIG. 3, the secondary side control circuit includes a signal transmission pin voltage detection circuit 120, a shunt regulator 150 and a standby adjustment circuit 140, and can optionally further include a drive gate 130 when needed. If the level of the output signal outputted via a pin USBP of the secondary side control circuit 12 is sufficient enough to drive the enable switch circuit 17, the drive gate 130 can be omitted.

The shunt regulator 150 generates the secondary side feedback signal S2 according to the VOUT related signal received by the pin FB of the secondary side control circuit 12.

The signal transmission pin voltage detection circuit 120 is coupled to the signal transmission pin (one or both of CC1 and/or CC2, abbreviated as CC1/CC2 hereinafter) of the power converter 10 and is configured to operably generate a detection signal VCC_DET according to a voltage at the signal transmission pin CC1/CC2. When the signal transmission pin CC1/CC2 of the power converter 10 is not connected to the power receiver 20 or when the signal transmission pin CC1/CC2 of the power converter 10 is connected to the power receiver 20 but it is not required to supply power form the power converter 10 to the power receiver 20, the voltage at the signal transmission pin CC1/CC2 will not fall within a range specified by a USB Type-C connector specification, which will be shown by the corresponding detection signal VCC_DET. (This embodiment is described by taking the USB Type-C connector as an example; in other embodiments which are applied to other connector standards, there will be a corresponding specification defining the connection conditions, which are detectable.) When the detection signal VCC_DET shows that the signal transmission pin CC1/CC2 of the power converter 10 is not connected to the power receiver 20 or it is not required to supply power form the power converter 10 to the power receiver 20, the present invention will set the power converter 10 in the standby mode. In addition, the output signal outputted from the pin USBP of the secondary side control circuit 12 can turn OFF the enable switch circuit 17.

On the other hand, when the signal transmission pin CC1/CC2 of the power converter 10 is connected to the power receiver 20 and it is required to supply power form the power converter 10 to the power receiver 20, the voltage at the signal transmission pin CC1/CC2 will fall within a range specified by the USB Type-C connector specification, which will be shown by the corresponding detection signal VCC_DET. Under such circumstance, the present invention will set the power converter 10 to the normal operation mode. In addition, the output signal outputted from the pin USBP of the secondary side control circuit 12 will turn ON the enable switch circuit 17.

The standby adjustment circuit 140 is coupled to the signal transmission pin voltage detection circuit 120 and the shunt regulator 150, and is configured to operably adjust the secondary side feedback signal S2 according to the detection signal VCC_DET.

In the present invention, there are many approaches for the secondary side control circuit 12 to adjust the secondary side feedback signal S2, so as to set the power converter 10 in the standby mode. For example, a first approach is thus: when the detection signal VCC_DET indicates that the voltage at the signal transmission pin CC1/CC2 does not fall within the range specified by the USB Type-C connector specification, the standby adjustment circuit 140 will adjust the secondary side feedback signal S2, to set the target level of the output voltage VOUT to a standby power saving level (e.g., 3V) which is lower than the normal operation level (e.g., 5V). As a consequence, the present invention saves power consumption in the standby mode.

Figure 5:
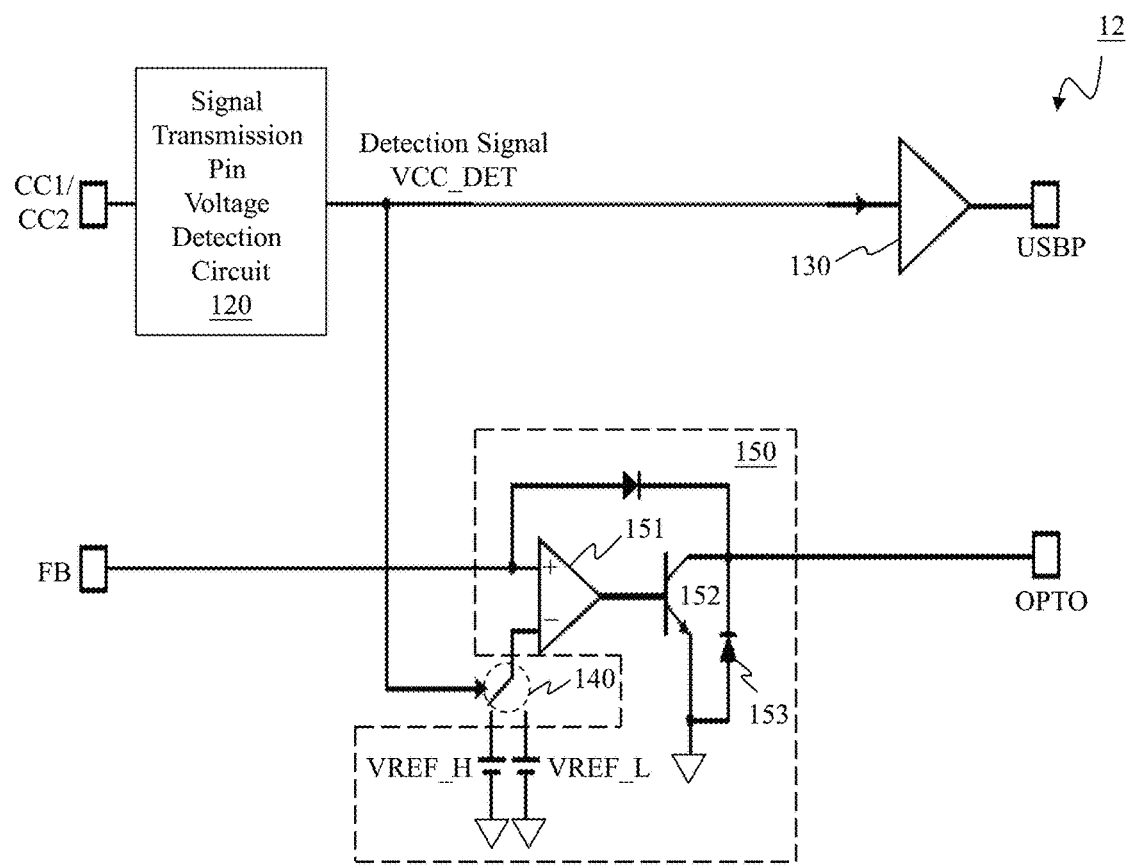
FIG. 5 shows a more specific embodiment of the secondary side control circuit 12 according to the block diagram of FIG. 3.
Figure 6:
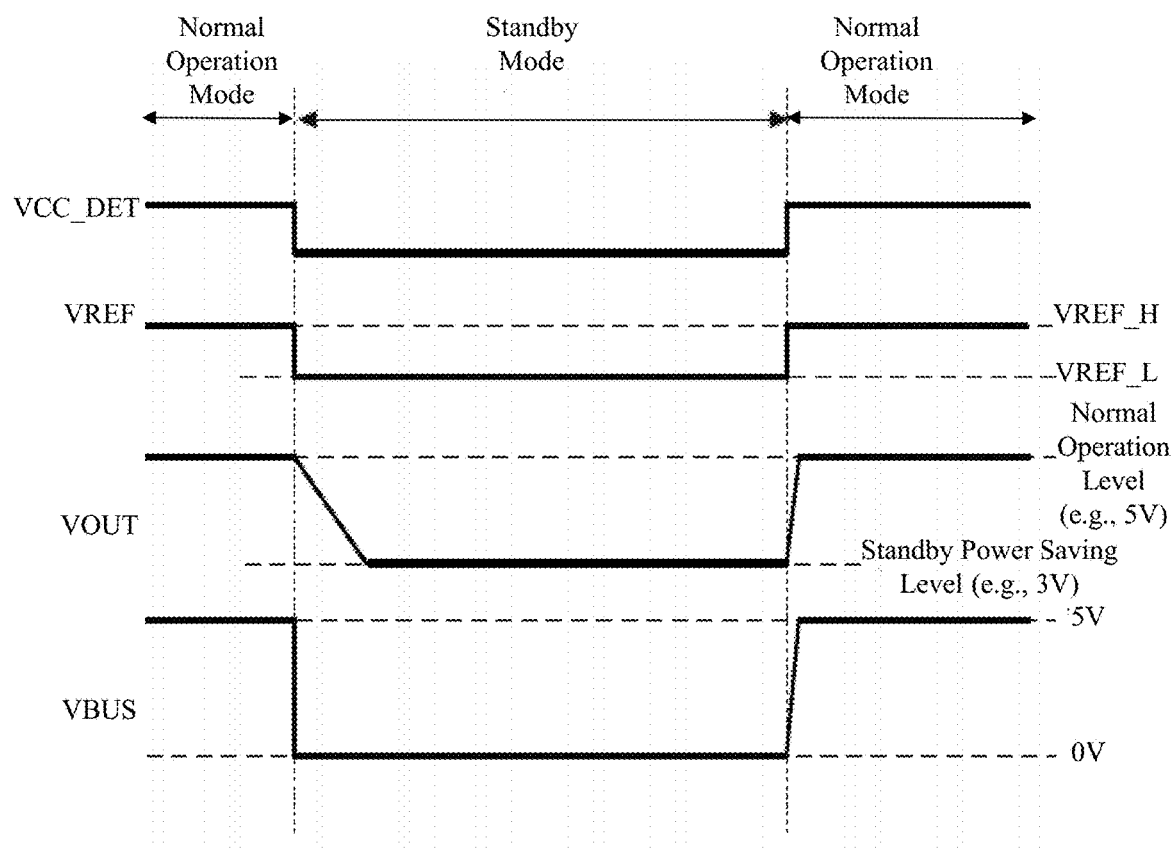
FIG. 6 shows that, when the embodiments of FIG. 3 and FIG. 5 operate under the standby mode, the output voltage is regulated at a standby power saving level which is lower than the normal operation level.

The above-mentioned first approach can be implemented by various hardware configurations; FIG. 5 and FIG. 6 show one possible implementation, and those skilled in this art can conceive many equivalents under the teaching by the present invention. FIG. 5 shows a specific embodiment of a secondary side control circuit 12 according to the block diagram of FIG. 3. FIG. 6 shows that, when the embodiments of FIG. 3 and FIG. 5 operate under the standby mode, the output voltage is regulated at the standby power saving level (e.g., 3V) which is lower than the normal operation level (e.g., 5V).

In this embodiment, the standby adjustment circuit 140 can be, for example but not limited to, a switch (as shown in FIG. 5). The shunt regulator 150 can include, for example but not limited to, an error amplifier 151, a BJT transistor 152 and a diode 153, connected as shown by FIG. 5. Because a shunt regulator 150 is well known to those skilled in the art, it is not redundantly explained in detail here.

Please refer to FIG. 6 in conjugation with FIG. 5. When the detection signal VCC_DET indicates that the voltage at the signal transmission pin CC1/CC2 does not fall within the range specified by the USB Type-C connector specification, the detection signal VCC_DET is at a low level and the enable switch circuit 17 is not conducted. Accordingly, the supply voltage VBUS (the voltage supplied to the power receiver 20, FIG. 1B) will drop from 5V to 0V. Under such circumstance, the standby adjustment circuit 140 will select a low level reference voltage VREF_L according to the detection signal VCC_DET, to be the reference input of the error amplifier 151 of the shunt regulator 150. Hence, the output of the error amplifier 151 and the secondary side feedback signal S2 generated by the BJT transistor 152 will correspondingly change. The feedback circuit 14 will generate a primary side feedback signal VCOMP corresponding to the standby mode according to the secondary side feedback signal S2. The switch control unit 13 will generate the operation signal VGATE according to the primary side feedback signal VCOMP corresponding to the standby mode, to control the power switch 16, thereby lowering down the output voltage VOUT to the standby power saving level. In this way, when the detection signal VCC_DET indicates that the voltage at the signal transmission pin CC1/CC2 does not fall within the range specified by the USB Type-C connector specification, the standby adjustment circuit 140 adjusts the secondary side feedback signal S2 to set the output voltage VOUT to the standby power saving level (e.g., 3V) which is lower than the normal operation level (e.g., 5V), thus saving power consumption.

On the other hand, when the detection signal VCC_DET indicates that the voltage at the signal transmission pin CC1/CC2 falls within the range specified by the USB Type-C connector specification, the secondary side control circuit 12 will enable the enable switch circuit 17 via the output signal outputted from the pin USBP of the secondary side control circuit 12. Under such circumstance, the standby adjustment circuit 140 will select a high level reference voltage VREF_H according to the detection signal VCC_DET, as the reference input of the error amplifier 151 of the shunt regulator 150. Hence, the output of the error amplifier 151 and the secondary side feedback signal S2 generated by the BJT transistor 152 will correspondingly change. The feedback circuit 14 will generate a primary side feedback signal VCOMP corresponding to the normal operation mode according to the secondary side feedback signal S2. The switch control unit 13 will generate the operation signal VGATE according to the primary side feedback signal VCOMP corresponding to the normal operation mode, to control the power switch 16, thereby elevating the output voltage VOUT to the normal operation level. In this way, when the detection signal VCC_DET indicates that the voltage at the signal transmission pin CC1/CC2 falls within the range specified by the USB Type-C connector specification, the standby adjustment circuit 140 adjusts the secondary side feedback signal S2, to set the output voltage VOUT to the normal operation level. As a consequence, the supply voltage VBUS will rise up from 0V to 5V.

Figure 4:
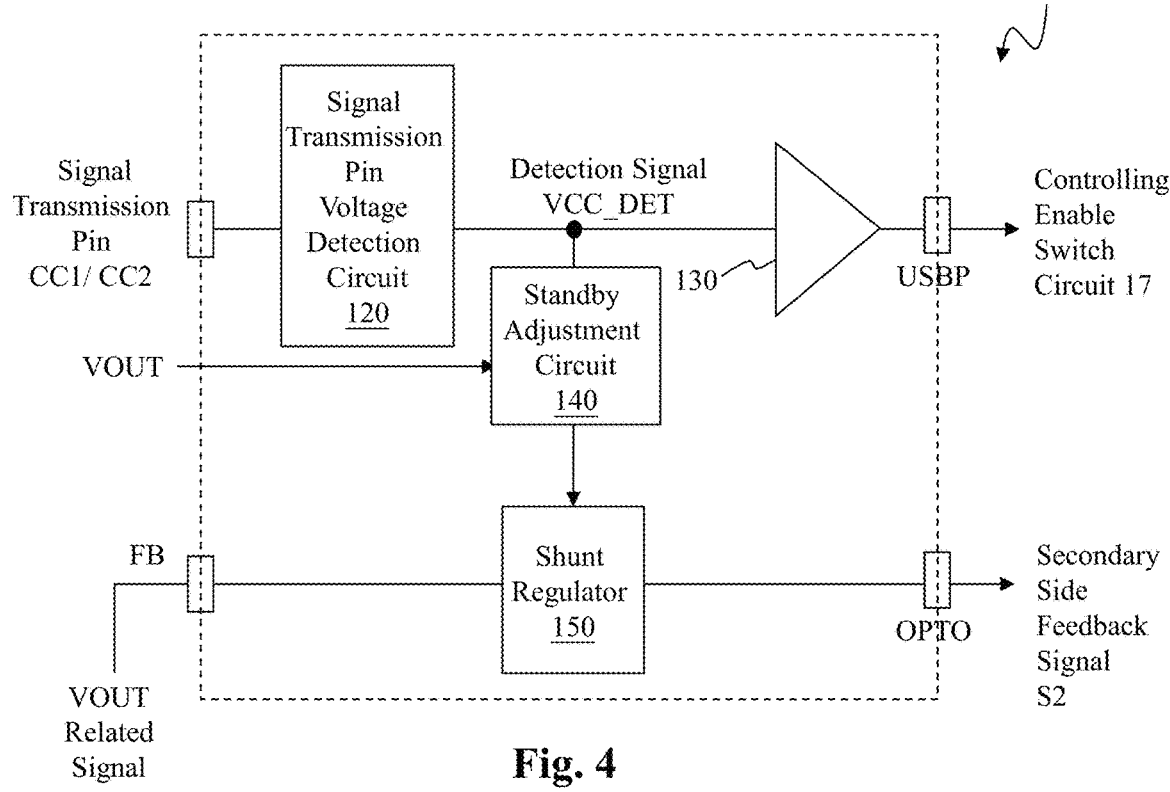
FIG. 4 shows a block diagram of a secondary side control circuit 12 according to another embodiment of the present invention.

Please refer to FIG. 4, which shows a block diagram of a secondary side control circuit 12 according to another embodiment of the present invention. As mentioned above, in the present invention, there are many approaches for the secondary side control circuit 12 to adjust the secondary side feedback signal S2, to set the power converter 10 to the a standby mode. For another example, a second approach is thus: when the detection signal VCC_DET indicates that the voltage at the signal transmission pin CC1/CC2 does not fall within the range specified by the USB Type-C connector specification, the standby adjustment circuit 140 will adjust the secondary side feedback signal S2, to cause the output voltage VOUT to hiccup within a range (e.g., 3V~4V) which is lower than the normal operation level (e.g., 5V).

Under the teaching by the present invention, it can be readily understood that, in addition to keeping the output voltage VOUT at a constant and causing the output voltage VOUT to hiccup, as long as the output voltage VOUT is kept lower than the normal operation level in the standby mode, the power consumption can be reduced in comparison with the prior art. Therefore, it is within the scope of the present invention to keep the output voltage VOUT at any constant or variable level lower than the normal operation level in the standby mode.

In the second approach, in order to cause the output voltage VOUT to hiccup within a range, the output voltage VOUT will have to be elevated when the output voltage VOUT reaches to a lower limit of the range. Accordingly, in the embodiment shown in FIG. 4, the standby adjustment circuit 140 adjusts the secondary side feedback signal S2 according to not only the detection signal VCC_DET, but also the output voltage VOUT. In contrast, in the embodiment shown in FIG. 3 and FIG. 5, the standby adjustment circuit 140 adjusts the secondary side feedback signal S2 solely according to the detection signal VCC_DET. It should be explained that, in the context of this specification, to perform an action "according to" a signal does not strictly require performing an action directly according to the signal itself, but instead can be performing an action indirectly according to a converted form of the signal; for example, to perform an action "according to the output voltage VOUT" can be performing an action according to a signal which is related to the output voltage VOUT (for example but not limited to a divided voltage of the output voltage VOUT).

Figure 7:
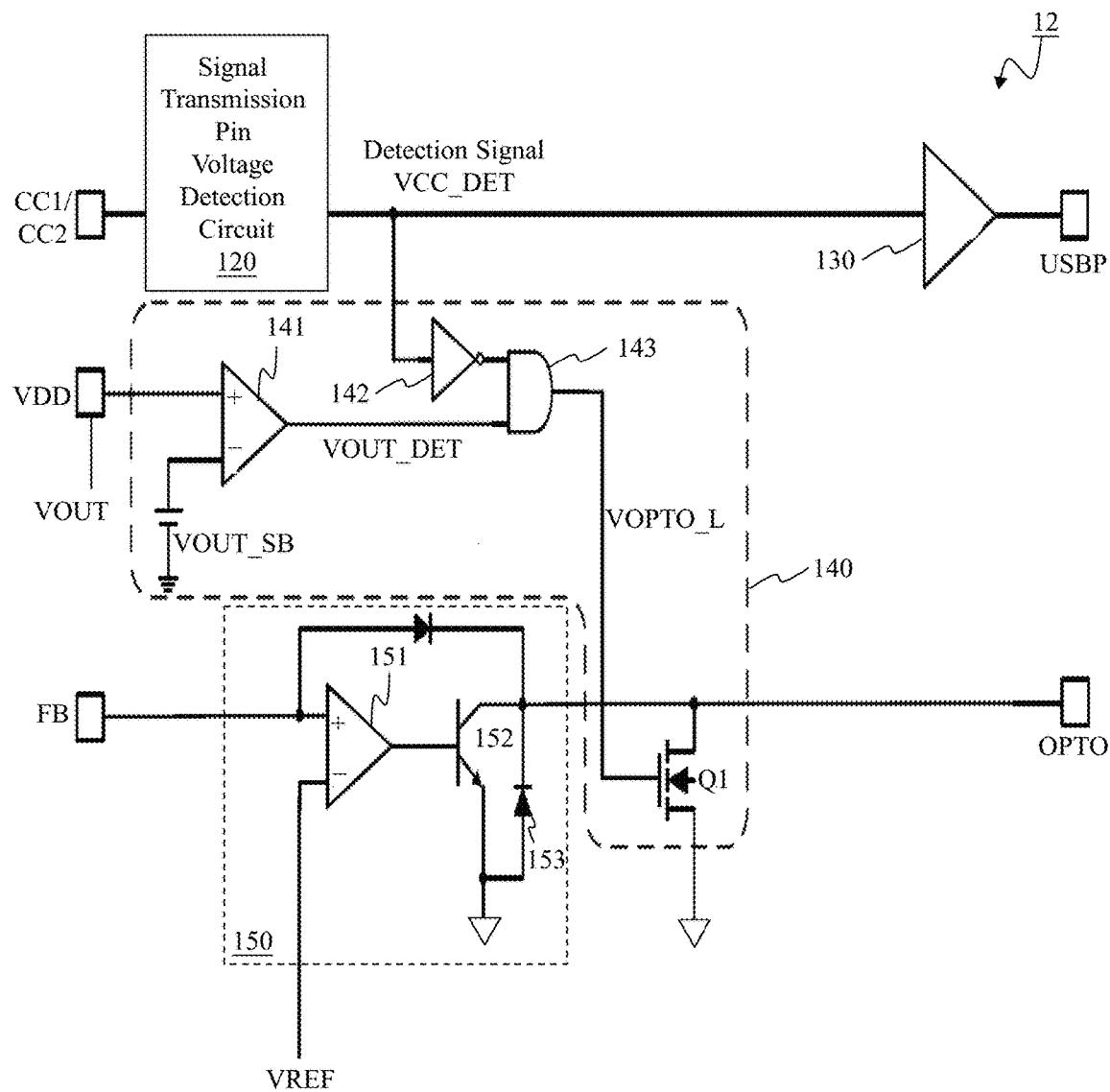
FIG. 7 shows a more specific embodiment of the secondary side control circuit 12 according to the block diagram of FIG. 4.
Figure 8:
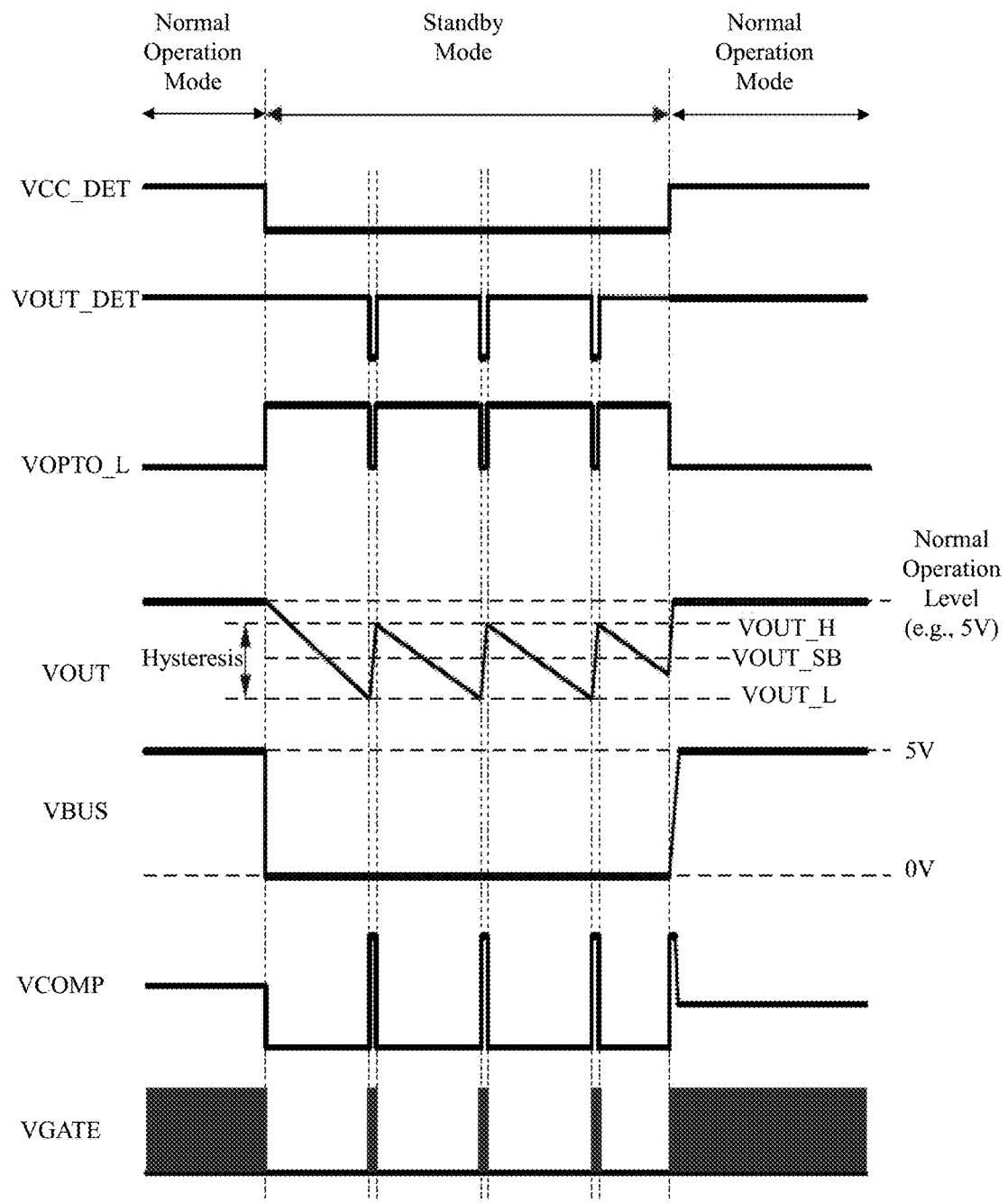
FIG. 8 shows that, when the embodiments of FIG. 4 and FIG. 7 operate under the standby mode, the output voltage hiccups within a range which is lower than the normal operation level.

The above-mentioned second approach can be implemented by various hardware configurations; FIG. 7 and FIG. 8 show one possible implementation, and those skilled in this art can conceive many equivalents under the teaching by the present invention. FIG. 7 shows another specific embodiment of a secondary side control circuit 12 according to the block diagram of FIG. 4. FIG. 8 shows that, when the embodiments of FIG. 7 and FIG. 8 operate under the standby mode, the output voltage hiccups (moves up and down) within a range (between level VOUT_H and level VOUT_L) which is lower than the normal operation level (e.g., 5V).

Please refer to FIG. 8 in conjugation with FIG. 7. When the detection signal VCC_DET indicates that the voltage at the signal transmission pin CC1/CC2 does not fall within the range specified by the USB Type-C connector specification, the secondary side control circuit 12 will turn OFF the enable switch circuit 17 via the output signal outputted from the pin USBP of the secondary side control circuit 12. Accordingly, the supply voltage VBUS will drop from 5V to 0V (as shown in FIG. 8), and the power converter 10 enters the standby mode wherein, in this embodiment, the output voltage VOUT enters a hiccup range.

More specifically, in this embodiment, the standby adjustment circuit 140 can be, for example but not limited to, a comparator 141, a NOT GATE 142, an AND GATE 143 and an adjustment switch Q1. The comparator 141 compares the output voltage VOUT (or its related signal) with an output voltage reference value VOUT_SB, to generate an output voltage comparison signal VOUT_DET. The information about the output voltage VOUT (or its related signal) can be retrieved from any appropriate source. In one embodiment, because the power of the secondary side control circuit 12 comes from the output voltage VOUT, the information about the output voltage VOUT or its related signal can be retrieved from a power pin VDD of the secondary side control circuit 12. In other embodiments, the information about the output voltage VOUT or its related signal can be retrieved from other sources. In this embodiment, preferably, the comparator 141 is a hysteresis comparator. In another embodiment, the comparator 141 is not a hysteresis comparator, and the output voltage reference value VOUT_SB can be correspondingly set to be another value.

The NOT GATE 142 and the AND GATE 143 together form a logic circuit. When the detection signal VCC_DET indicates that the voltage at the signal transmission pin CC1/CC2 does not fall within the range specified by the USB Type-C connector specification and when the output voltage VOUT is higher than the output voltage reference value VOUT_SB, the logic circuit will generate a control signal VOPTO_L to turn ON the adjustment switch Q1, thus shorting the secondary side feedback signal terminal OPTO to ground. The feedback circuit will generate a primary side feedback signal VCOMP corresponding to the secondary side feedback signal S2. Under such circumstance, the primary side feedback signal VCOMP is at a low level (as shown in FIG. 8). The switch control unit 13 will generate the operation signal VGATE according to the primary side feedback signal VCOMP, to turn OFF the power switch 16 (or equivalently, the generation of the operation signal VGATE is disabled), so that the output voltage VOUT will be lowered down.

Under the standby mode, when the output voltage VOUT is decreased to be lower than the output voltage reference value VOUT_SB, the control signal VOPTO_L will transit from a high level state to a low level state (FIG. 8 shows the delay caused by hysteresis. If the comparator 141 is not a hysteresis comparator, the output voltage VOUT can be compared with VOUT_H and VOUT_L, respectively). As a result, the adjustment switch Q1 is OFF.

Because the adjustment switch Q1 is turned OFF, the secondary side feedback signal S2 is now generated by the shunt regulator 150. The feedback circuit 14 will generate a primary side feedback signal VCOMP corresponding to the secondary side feedback signal S2. Under such circumstance, because the output voltage VOUT is lower than the normal operation level, the primary side feedback signal VCOMP is at a high level (as shown in FIG. 8). The generation of the operation signal VGATE is enabled, and the switch control unit 13 will generate the operation signal VGATE according to the primary side feedback signal VCOMP, to operate the power switch 16. Therefore, the output voltage VOUT is elevated from the level VOUT_L to the level VOUT_H. The level VOUT_L and the level VOUT_H are both lower than the normal operation level of the normal operation mode (as shown in FIG. 8). When the output voltage VOUT is higher than the output voltage reference value VOUT_SB, the control signal VOPTO_L will turn ON the adjustment switch Q1 again, whereby the power switch 16 will be turned OFF, and the output voltage VOUT will be lowered down again. Consequently, the output voltage will hiccup between the level VOUT_H and the level VOUT_L.

On the other hand, when the detection signal VCC_DET indicates that the voltage at the signal transmission pin CC1/CC2 falls within the range specified by the USB Type-C connector specification, the secondary side control circuit 12 will turn ON the enable switch circuit 17 via the output signal outputted from the pin USBP of the secondary side control circuit 12. Under such circumstance, the logic circuit will turn OFF the adjustment switch Q1 according to the detection signal VCC_DET, so that the secondary side feedback signal S2 is generated by the shunt regulator 150. The feedback circuit 14 will generate a primary side feedback signal VCOMP corresponding to the normal operation mode according to the secondary side feedback signal S2. The switch control unit 13 will generate the operation signal VGATE according to the primary side feedback signal VCOMP corresponding to the normal operation mode, to control the power switch 16. Therefore, the output voltage VOUT is elevated to the normal operation level. In this way, when the detection signal VCC_DET indicates that the voltage at the signal transmission pin CC1/CC2 falls within the range specified by the USB Type-C connector specification, the standby adjustment circuit 140 will turn OFF the adjustment switch Q1, and the secondary side feedback signal S2 will cause the output voltage VOUT to remain at the normal operation level. As a consequence, the supply voltage VBUS will rise up from 0V to 5V (as shown in FIG. 8).

Apparently, the meanings of high and low levels of a signal are interchangeable, and in this case the logic circuit should be correspondingly modified.

Moreover, in the embodiment shown in FIG. 7, if the adjustment switch Q1 is controlled solely according to the detection signal VCC_DET, and not according to the output voltage VOUT (i.e., the circuits 141-143 are omitted), the circuit becomes another implementation of the embodiment shown in FIG. 3.

Figure 9:
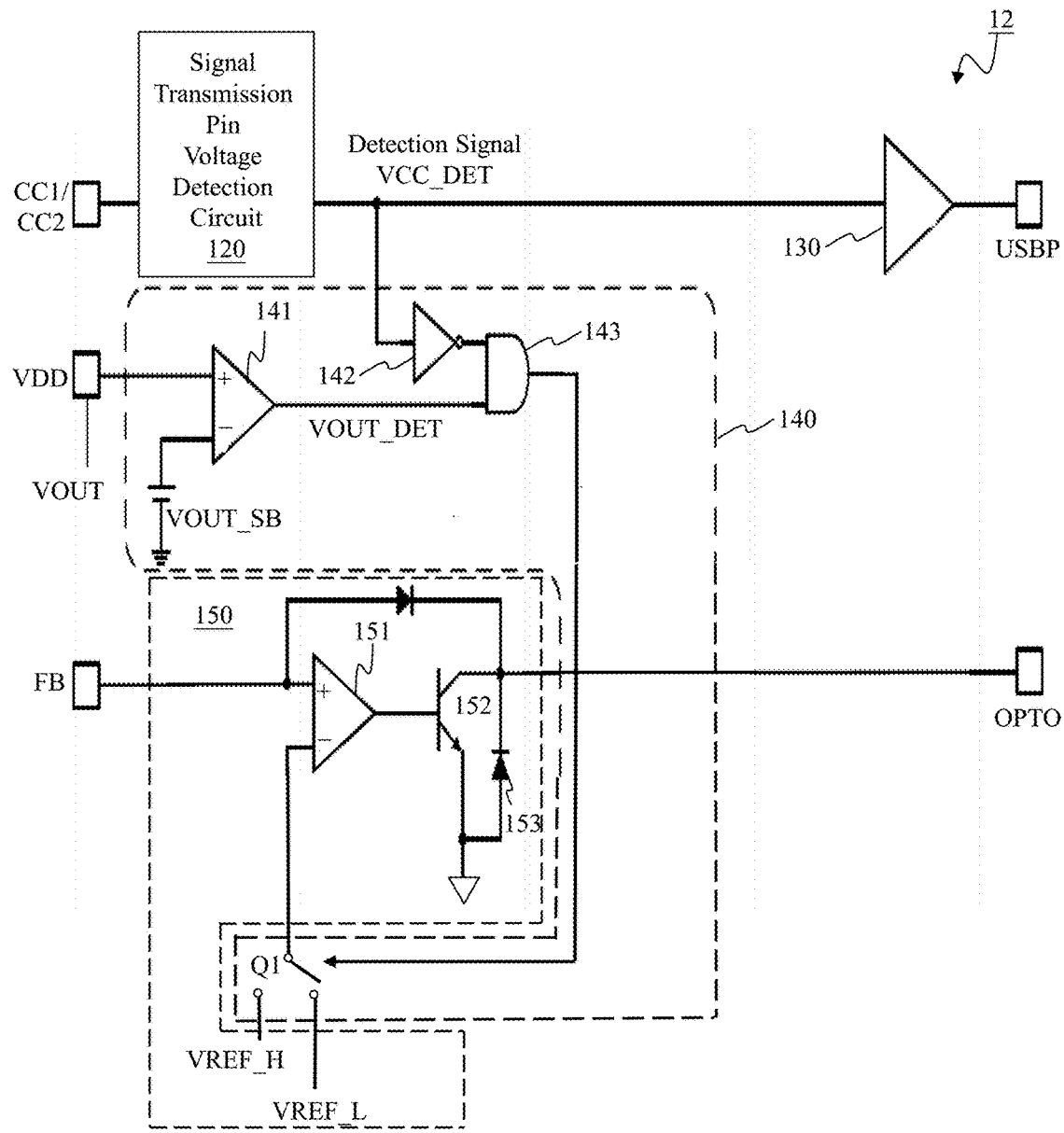
FIG. 9 shows another more specific embodiment of the secondary side control circuit 12 according to the block diagram of FIG. 4.

FIG. 9 shows another embodiment for the second approach. This embodiment does not employ an adjustment switch Q1 to short the secondary side feedback signal terminal OPTO to ground. Instead, this embodiment employs the adjustment switch Q1 to select between a low level reference voltage VREF_L and a high level reference voltage VREF_H for the shunt regulator 150. Such an arrangement also can cause the output voltage VOUT to hiccup within a range which is lower than the normal operation level.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or a resistor. For another example, it is not limited for a high level of a signal to represent ON and a low level of the signal to represent OFF. The meaning of a high level and the meaning of a low level of a signal are interchangeable, with corresponding amendments of the circuits processing these signals. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power converter, configured to operably convert an input voltage to an output voltage at an output terminal of the power converter and supply power to a power receiver connected to the output terminal, the power converter comprising:
   a transformer;
   a power switch which is coupled to a primary winding of the transformer and which is configured to be operably turned ON or turned OFF according to an operation signal, to control the transformer so that the input voltage is converted to the output voltage;
   a switch control unit which is coupled to the power switch and which is configured to operably generate the operation signal according to a primary side feedback signal;
   an enable switch circuit which is coupled between the output terminal and the power receiver, to control power transmission from the output terminal to the power receiver;
   a secondary side control circuit which is coupled to the secondary winding of the transformer, the secondary side control circuit having at least one signal transmission pin for communicating with the power receiver, wherein the secondary side control circuit controls the enable switch circuit according to a voltage at the at least one signal transmission pin and the secondary side control circuit generates a secondary side feedback signal according to the output voltage; and
   a feedback circuit having one end coupled to the switch control unit and another end coupled to the secondary side control circuit, wherein the feedback circuit is configured to operably generate the primary side feedback signal according to the secondary side feedback signal;

wherein the secondary side control circuit includes:

a signal transmission pin voltage detection circuit which is coupled to the at least one signal transmission pin and which is configured to operably generate a detection signal according to the voltage at the at least one signal transmission pin;

a shunt regulator which is configured to operably generate the secondary side feedback signal according to a signal related to the output voltage (output voltage related signal);

a standby adjustment circuit which is coupled to the signal transmission pin voltage detection circuit and the shunt regulator and which is configured to operably adjust the secondary side feedback signal at least according to the detection signal;

wherein the secondary side control circuit adjusts the secondary side feedback signal (1) according to the voltage at the at least one signal transmission pin, or (2) according to the voltage at the at least one signal transmission pin and the output voltage, so as to adjust the output voltage;

thereby, when the power converter is in a standby mode, the output voltage is lower than a normal operation level in a normal operation mode, to save power in the standby mode.

2. The power converter of claim 1, wherein the standby adjustment circuit adjusts the secondary side feedback signal according to the detection signal and the output voltage.

3. The power converter of claim 2, wherein:

when the power converter is in the standby mode and when the output voltage is higher than a lower limit of the range, the standby adjustment circuit causes the shunt regulator to select a low level reference voltage, thereby causing the output voltage to lower down; and when the power converter is in the standby mode and when the output voltage is decreased to the lower limit of the range, the standby adjustment circuit causes the shunt regulator to select a high level reference voltage, thereby causing the output voltage to rise up.

4. The power converter of claim 2, wherein the standby adjustment circuit includes at least an adjustment switch, which is configured to operably adjust the secondary side feedback signal, and wherein the standby adjustment circuit controls the adjustment switch according to the detection signal and the output voltage, to adjust the secondary side feedback signal, so that the output voltage hiccups within a range which is lower than the normal operation level.

5. The power converter of claim 4, wherein:

when the power converter is in the standby mode and when the output voltage is higher than a lower limit of the range, the standby adjustment circuit controls the adjustment switch to adjust the secondary side feedback signal, thereby causing the output voltage to lower down; and when the power converter is in the standby mode and when the output voltage is decreased to the lower limit of the range, the standby adjustment circuit controls the adjustment switch to adjust the secondary side feedback signal, thereby causing the output voltage to rise up.

6. The power converter of claim 1, wherein:

when the power converter is in the standby mode, the standby adjustment circuit causes the shunt regulator to select a low level reference voltage, to adjust the secondary side feedback signal, whereby the output voltage is regulated at a standby power saving level which is lower than the normal operation level; and when the power converter is in the normal operation mode, the standby adjustment circuit causes the shunt regulator to select a high level reference voltage, to adjust the secondary side feedback signal, whereby the output voltage is regulated at the normal operation level.

7. The power converter of claim 1, wherein the standby adjustment circuit includes at least an adjustment switch, which is configured to operably adjust the secondary side feedback signal, and wherein the standby adjustment circuit controls the adjustment switch according to the detection signal, to adjust the secondary side feedback signal, so that the output voltage is regulated at the standby power saving level in the standby mode.

8. A power converter, configured to operably convert an input voltage to an output voltage at an output terminal of the power converter and supply power to a power receiver connected to the output terminal, the power converter comprising:

a transformer;

a power switch which is coupled to a primary winding of the transformer and which is configured to be operably turned ON or turned OFF according to an operation signal, to control the transformer so that the input voltage is converted to the output voltage;

a switch control unit which is coupled to the power switch and which is configured to operably generate the operation signal according to a primary side feedback signal;

an enable switch circuit which is coupled between the output terminal and the power receiver, to control power transmission from the output terminal to the power receiver;

a secondary side control circuit which is coupled to the secondary winding of the transformer, the secondary side control circuit having at least one signal transmission pin for communicating with the power receiver, wherein the secondary side control circuit controls the enable switch circuit according to a voltage at the at least one signal transmission pin and the secondary side control circuit generates a secondary side feedback signal according to the output voltage; and a feedback circuit having one end coupled to the switch control unit and another end coupled to the secondary side control circuit, wherein the feedback circuit is configured to operably generate the primary side feedback signal according to the secondary side feedback signal;

wherein the secondary side control circuit includes:

a signal transmission pin voltage detection circuit which is coupled to the at least one signal transmission pin and which is configured to operably generate a detection signal according to the voltage at the at least one signal transmission pin;

a shunt regulator which is configured to operably generate the secondary side feedback signal according to a signal related to the output voltage (output voltage related signal);

a standby adjustment circuit which is coupled to the signal transmission pin voltage detection circuit and the shunt regulator and which is configured to operably adjust the secondary side feedback signal at least according to the detection signal;

wherein the secondary side control circuit adjusts the secondary side feedback signal
(1) according to the voltage at the at least one signal transmission pin, or
(2) according to the voltage at the at least one signal transmission pin and the output voltage,
so as to adjust the output voltage;
thereby, when the power converter is in a standby mode, the output voltage is lower than a normal operation level in a normal operation mode, to save power in the standby mode;
wherein when the power converter is in the standby mode, the output voltage is regulated at a standby power saving level which is lower than the normal operation level, or the output voltage hiccups within a range which is lower than the normal operation level.

9. A control circuit of a power converter having a transformer, the control circuit being configured to operably control a secondary side of the transformer, the power converter being configured to operably convert an input voltage to an output voltage at an output terminal of the power converter and supply power to a power receiver connected to the output terminal, the power converter comprising: a primary side circuit which is configured to operably control the transformer according to a primary side feedback signal, to convert the input voltage to the output voltage; a feedback circuit having one end coupled to the primary side circuit and another end coupled to the control circuit, wherein the feedback circuit is configured to operably generate the primary side feedback signal according to a secondary side feedback signal generated by the control circuit; and an enable switch circuit which is coupled between the output terminal and the power receiver to control power transmission from the output terminal to the power receiver; the control circuit comprising:
at least one signal transmission pin which is configured to operably communicate with the power receiver;
a signal transmission pin voltage detection circuit which is coupled to the at least one signal transmission pin and which is configured to operably generate a detection signal according to the voltage at the at least one signal transmission pin;
a shunt regulator which is configured to operably generate the secondary side feedback signal according to an output voltage related signal;
a standby adjustment circuit which is coupled to the signal transmission pin voltage detection circuit and the shunt regulator and which is configured to operably adjust the secondary side feedback signal at least according to the detection signal;
thereby, when the power converter is in a standby mode, by adjusting the secondary side feedback signal, the output voltage is regulated to be lower than a normal operation level in a normal operation mode, to save power in the standby mode.

10. The control circuit of the power converter having the transformer of claim 9, wherein the standby adjustment circuit adjusts the secondary side feedback signal according to the detection signal and the output voltage.

11. The control circuit of the power converter having the transformer of claim 10, wherein:
when the power converter is in the standby mode and when the output voltage is higher than a lower limit of the range, the standby adjustment circuit causes the shunt regulator to select a low level reference voltage, thereby causing the output voltage to lower down; and
when the power converter is in the standby mode and when the output voltage is decreased to the lower limit of the range, the standby adjustment circuit causes the shunt regulator to select a high level reference voltage, thereby causing the output voltage to rise up.

12. The control circuit of the power converter having the transformer of claim 10, wherein the standby adjustment circuit includes at least an adjustment switch, which is configured to operably adjust the secondary side feedback signal, and wherein the standby adjustment circuit controls the adjustment switch according to a level of the detection signal and the output voltage, to adjust the secondary side feedback signal, so that the output voltage hiccups within a range which is lower than the normal operation level.

13. The control circuit of the power converter having the transformer of claim 12, wherein:
when the power converter is in the standby mode and when the output voltage is higher than a lower limit of the range, the standby adjustment circuit controls the adjustment switch to adjust the secondary side feedback signal, thereby causing the output voltage to lower down; and
when the power converter is in the standby mode and when the output voltage is decreased to the lower limit of the range, the standby adjustment circuit controls the adjustment switch to adjust the secondary side feedback signal, thereby causing the output voltage to rise up.

14. The control circuit of the power converter having the transformer of claim 9, wherein:
when the power converter is in the standby mode, the standby adjustment circuit causes the shunt regulator to select a low level reference voltage, to adjust the secondary side feedback signal, whereby the output voltage is regulated at a standby power saving level which is lower than the normal operation level; and
when the power converter is in the normal operation mode, the standby adjustment circuit causes the shunt regulator to select a high level reference voltage, to adjust the secondary side feedback signal, whereby the output voltage is regulated at the normal operation level.

15. The control circuit of the power converter having the transformer of claim 9, wherein the standby adjustment circuit includes at least an adjustment switch, which is configured to operably adjust the secondary side feedback signal, and wherein the standby adjustment circuit controls the adjustment switch according to a level of the detection signal, to adjust the secondary side feedback signal, so that the output voltage is regulated at the standby power saving level in the standby mode.

* * * * *